Aug. 16, 1932.   H. E. NORVIEL   1,871,905
COINCIDENTAL LOCK
Filed Jan. 26, 1929

Inventor
Harry E. Norviel
By Spencer, Hardman & Fehr
His Attorneys

Patented Aug. 16, 1932

1,871,905

UNITED STATES PATENT OFFICE

HARRY E. NORVIEL, OF ANDERSON, INDIANA, ASSIGNOR TO DELCO-REMY CORPORATION, OF ANDERSON, INDIANA, A CORPORATION OF DELAWARE

COINCIDENTAL LOCK

Application filed January 26, 1929. Serial No. 335,305.

This invention relates to coincidental locks for preventing theft or unauthorized use of an automotive vehicle, and particularly to a coincidental lock wherein a single key controlled member may be operated to open the ignition switch and to prevent the use of the gear shift lever to connect the engine with the transmission mechanism.

In this type of coincidental lock it is usually necessary as disclosed by the prior art, to move the gear shift lever to the neutral position in order to actuate the controller unit of the device. In many instances it is more desirable to set the gear shift lever in another position than the neutral position and also to lock the vehicle against unauthorized movement. This desire is exemplified by that class of drivers who, when stopping on an incline are accustomed to shift the gears to one of the driving relations to operate as a brake while leaving the car parked etc. The present invention contemplates such practice, and makes it possible to condition the vehicle against unauthorized use, whether or not the devices desired to be controlled are in the preferred associated relation.

Accordingly the objects of the present invention include the provision of a novel coincidental lock referred to which is durable and reliable and can be manufactured at low cost. More particularly, it is an object of the present invention to provide certain improvements conducive to economy and manufacture in the type of coincidental lock shown in the Patent 1,674,315, of Carl W. Blossom and Elmer C. Peterson, granted June 19, 1928.

Another object is to provide a coincidental lock for controlling a plurality of functions as to open and close an electric circuit or the like and to project and withdraw a locking bolt, in which means are included for positively controlling one of the functions, and for conditionally controlling another of the functions.

Another object is to provide a coincidental lock, which can be actuated to control one of the associated mechanisms and store up energy for the actuation of another device upon proper conditioning of the said other device.

Further objects and advantages of the present invention will be apparent from the following description, reference being had to the accompanying drawing, wherein a preferred form of embodiment of the present invention is clearly shown.

Figures 1, 2:
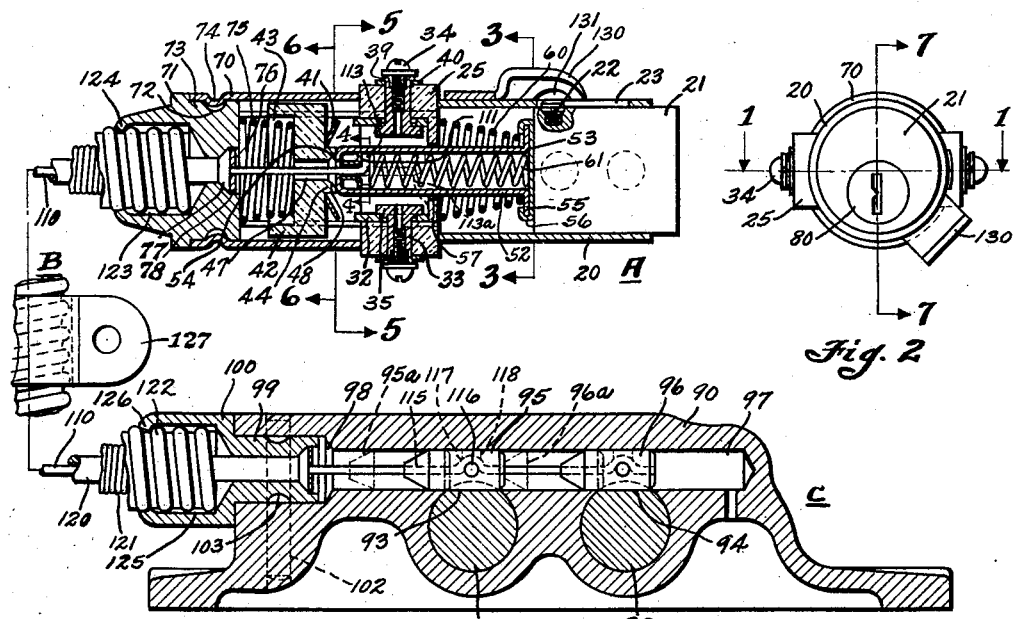
Fig. 1 is a view partly in longitudinal section of a coincidental lock embodying the present invention, and is taken partly on the line 1—1 of Fig. 2.
Fig. 2 is an end view of the end thereof which is mounted upon the instrument board of the automobile.

Figs. 3, 4, 5 and 6 are sectional views on the lines 3—3, 4—4, 5—5 and 6—6 respectively of Fig. 1.

Figure 7:
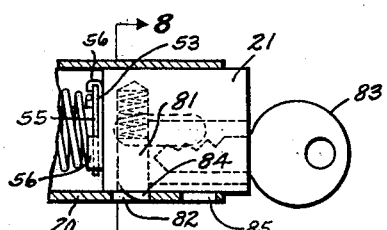

Fig. 7 is a fragmentary longitudinal sectional view of a portion of the device showing the key shaft and lock barrel, and taken on the line 7—7 of Fig. 2.

Figure 8:
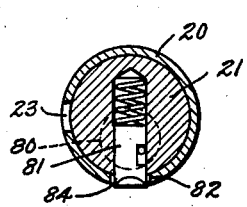

Fig. 8 is a sectional view on the line 8—8 of Fig. 7.

In the drawing there is illustrated a coincidental lock of the type referred to, which embraces the controller unit A, that is operatively attached by a connector unit B, to a controlled device C, for a purpose and in a manner that will later appear.

The controller device A, comprises in main, a shell or case as a metal tube, which is closed at one end by a lock cylinder assembly, usually known as the key controlled device. Within the shell, and operatively associated with the key controlled device there is provided a contact actuator assembly supporting and driving a bridging contact, and a control member. An armored control means with a support therefor forms a closure for the other end of the shell, as will presently be explained.

In the drawing 20 designates the metal tube which defines the shell, and it is formed preferably by bending sheet metal into a cylindrical form, and by holding the abutting ends together by suitable interlocking joints not shown, but familiar to those skilled in the art.

The lock cylinder assembly or key controlled device or lock barrel 21 is capable of longitudinal movement, and is retained within the end of the shell 20 by means of the screw pin 22 riding along the slot 23 in the wall of the shell 20. The other end of the shell 20 receives a cylindrical portion 24 of a non-conducting terminal block 25, positioned within the notches 26 formed by bifurcating the end of the shell 20, to provide the tongue members 27. The block 25 provides a partition dividing the shell or case 20 into compartments receiving, respectively, the key controlled device or lock barrel 21 and a movable contact carrier 42.

Figures 4, 5:
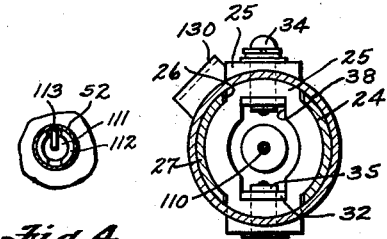
Figure 6:
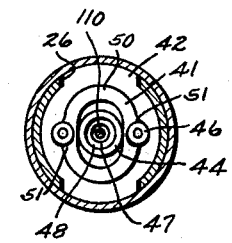

The block 25 insulatingly supports switch contacts 32 which are secured by terminal bushings 33, each receiving a terminal screw 34. As shown in Figs. 1 and 5, each contact plate 32 fits within a recess 38 in the block 25 having parallel sides so that the plate 32 cannot turn while located within the recess 38. The terminal bushing 33 passes through the contact 32, and is provided with a headed member 35 and is held in engagement with the plate 32 as shown in Fig. 1, by riveting over a portion of it as indicated by the numeral 39 against a washer 40 located on the outside of the block 25. This prevents the bushing 33 from turning when the terminal screw 34 is turned.

The contacts 32 are engageable by a resilient ring contact or bridging member 41, insulatingly supported by a non-conducting block or contact carrier 42 which is slidable within the inner end of the tube 20, and guided by the tongues 27.

The carrier 42 is somewhat cup-shaped in formation, being moulded from insulating material to provide the cup-shaped recess or spring receptacle 43, the hub 44, and the guide lugs, which latter are slidably received within the bifurcations of the case 20. Within the body of the carrier 42, are anchored the tubular headed inserts 46 which provide a retaining means for the ring contact 41, by the shank portion thereof being received by apertured or notched ears 51 of the ring, and the tubular portions of the protruding inserts being turned over to secure the contact plate 41 against the carrier 42. The spring contact ring 41 is forced out of the planar alignment that it would naturally assume into that form in which the web portions 50 between the attaching ears 51, are angularly disposed with respect to a common plane, as shown in Fig. 1, and when assembled with its carrier 42 within the case in proper relation with the fixed contact carrier 25, will provide for resilient and wiping engagement with the fixed contacts 32, as will hereinafter appear. Centrally of the block 42 and extending longitudinally thereof, is a bore 47 terminating in a countersink 48 centrally of the hub 44.

Figure 3:
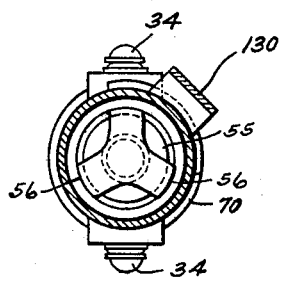

The countersink 48 provides for the seating engagement of a contact actuating member, which comprises a short tube or sleeve 52 connected at one end with a sleeve cover or plate member 53 and having one end thereof rolled inwardly as at 54 to provide a seating member to cooperate with the countersink 44. In the present instance the tube 52 and plate or cup 53 are connected by spinning the end of the sleeve 52 to provide the flange 55. The cup 53 is somewhat cruciform in plan providing the arms 56 which are bent about the edge of the flange 55 as shown in Figs. 1, 3 and 7. The cap thus secured to the sleeve forms a closure therefor and an abutment member for engagement of the key controlled device or lock barrel 21. The contact carrier 42 with its associated actuating member are contained within the case 20 with the tube 52 passing through the central aperture 57 of the block 25, and with the cap member disposed between the inner end of the barrel 21 and the terminal block 25 so that positive driving engagement will be maintained between the barrel 21 and the contact actuator 52. In part this is acomplished by the compression spring 60 placed in the shell 20 between the block 25 and the flanged portion 55 of the sleeve 52, so that actuating member 52 may return to normal position, or follow up the release of the plug 21 from the position illustrated in Fig. 1. The spring thus disposed tends to urge the actuator assembly and plug toward the right as viewed in Fig. 1, and thereby allows the completion of the circuit closing function through the contacts 32 by the bridging contacts 41, as will be explained.

The inner end of the tube 20, beyond the block 25, is provided with a reinforcing collar 70, permanently fixed thereto as by spot welding, which prevents the removal of the fixed contact carrier 25 from the bifurcated or notched end of the tubular case 20, and provides a housing and protecting inclosure for the switch contacts hereinbefore described. A conduit support 71 is received by the reinforcing member 70, and is permanently fixed thereto as by staking in a number of places, so that a portion of the member 70 is struck into an annular groove 72 about the reduced portions 73 of the support 71 as indicated at 74. Between the inner end of the support 71 and in the receptacle 43 of the contact carrier 42, is disposed a spring 75 normally urging the contact carrier 42, to a circuit closed position, as will be seen by reference to Fig. 1.

The spring 75 is of sufficient strength to move the contact carrier 42 toward the block 25, when so permitted by the retraction of the contact actuator 52, so that the member 41 is brought into engagement with the contacts 32, and flexed somewhat toward the body of the block 42. This flexing of the member 41 while in making and breaking engagement with the contacts 32 presents a wiping action between the contacting surfaces which always insure bright and clean electrical connections.

The lock barrel 21 may, and usually does, embody one of the locking devices well known in the art, which, in this instance, is exemplified by Figs. 7 and 8. Here, the barrel 21 is provided with a key cylinder 80 operable in the usual manner to withdraw a spring pressed bolt 81 from an aperture 82 in the adjacent casing or tube 20, upon the insertion and manipulation of the proper key 83 as is usual and well known to those skilled in the art. In the type of lock barrel referred to in this form, it is possible to move the barrel 21 from its circuit closed position, in which the end 84 of the bolt 81 is disposed in an aperture 85 of the tube 20 to a circuit open position, which is that position illustrated in Figs. 1 and 7, without the use of the key 83, since the bolt 81 rides over the portion of the case 20 between the apertures 82 and 85 when the barrel 21 is manually depressed or forced inwardly to the position as illustrated in Figs. 1 and 7. The reverse movement of the barrel 21 cannot be accomplished, however, without the use of the proper key 83.

Movement of the lock barrel 21 from the circuit closed position to the circuit open position, or the position illustrated in Fig. 1, will move the contact carrier 42 with the cap member 53 inwardly therewith, against the springs 75 and 60 respectively. The movement of these elements is advantageously applied to the manipulation of a bolting unit, or additional locking unit to prevent the unauthorized manipulation of certain controls or parts of the automotive vehicle connecting the power plant with the driving wheels thereof and is accomplished in this instance by providing a rigid and non-demountable connection between the control unit, and a remotely positioned bolting unit.

The endwise movement of the barrel 21, with the associated actuator assembly, is used in this instance to control a member which will prevent operation of the transmission mechanism to connect the engine with the driving axle of the vehicle as appears from the description that follows:

The transmission gear shift mechanism is not shown herein, but it will be understood to be enclosed in a case, the presence of which is shown at 90 of Fig. 1, and to include a pair of plates or rods 91 and 92 slidably supported by the case 90 and movable when the gear shift lever is used to connect the engine with the vehicle propeller shaft, in any one of its several selective gears. It will be further understood that when the gear shift lever is in the neutral position, that members 91 and 92 will be located so that notches 93 and 94 provided respectively by the members will be located directly adjacent to each other so as to receive one of the locking bolts 95 and 96 within a bore 97, extending substantially at right angles to the direction of movement of the members 91 and 92.

The bore 97 is enlarged at the outer end as at 98 and is designed to receive a reduced portion 99 of a sleeve member 100. The sleeve 100 constitutes a conduit support and guide for the locking bolts 95 and 96. The locking bolts 95 and 96 are securely attached to a Bowden wire 110, which has connection to the controller unit A described above, and when operated thereby, the bolts 95 and 96 will be moved into and out of the notches 93 and 94 to prevent movement of the rods 91 and 92, as will later appear. The bolting unit is retained in non-demountable relation with respect to the gear case 90, by means of the reduced portion 99 thereof being inserted within the enlarged portion 98 of the bore 97, and fixed therein by a pin 102 driven through a portion of the case 90 into an annular groove 103 of the reduced portion 99 of the sleeve.

The control unit and the bolting unit hereinabove described are operatively connected by an armored protective means as follows:

The operative control B between the units A and C comprises a Bowden wire 110 passing through an eyelet 111 within the tube 52 adjacent the rolled end 54, which eyelet is provided with a flange 112 notched to receive the end of the Bowden wire 110, bent into a loop or lateral extension as at 113 to prevent removal or withdrawal of the wire from the sleeve 111 just described.

The Bowden wire 110 extends from the tube 52 through the sleeve portions or conduit supports 71 and 100, and is permanently fixed at the other end to the locking bolts 95 and 96, in any desired manner. In the present instance the wire 110 is inserted in a longitudinal bore 115 of the bolts and is retained therein by a pin 116 driven through a transverse hole in the bolt, to form a loop 117 and force it into a second lateral recess 118 adjacent the longitudinal recess 115. The Bowden wire is encased by a Bowden wire tube 120 which passes through the central apertures of the conduit supports 71 and 100 and which are fixed thereto in the following manner: The sleeve 71 is counterbored as at 76 providing a recess for the flaring end or expanded edge 77 of the Bowden wire tube 120 as clearly shown in Fig. 1. Against the end of the Bowden wire tube thus expanded and within the countersink 76 is placed a washer 78, which is retained therein in any preferred manner as by staking. The other end of the Bowden wire tube is fixed to the sleeve 100 in a similar manner.

The Bowden wire control is protected against rupture, or tampering with, by an inner cable 121 surrounded by an outer armored conduit 122. One end of the armor 122 is received in an enlarged bore 123 of the sleeve 71 and is permanently retained therein as by swedging the sleeve portion about the end of the armor as indicated at 124. The other end of the armor 122 is received within a similar recess 125 of the sleeve 100 and is permanently retained therein as by swedging, as shown at 126. One or more supporting clips 127 may be provided to support the intermediate portion of the Bowden wire control and armor between the control unit and bolting unit, and attached to any convenient form of structure therebetween, thus preventing possibility of stretching the control unit sufficiently to withdraw the bolts from locking position.

Secured to the case 20 of the control unit is an angular supporting bracket 130, provided with a hole 131 for supporting the unit, in a convenient position to some part of the vehicle structure.

It is desirable, as has been explained above, to associate the connecting unit B with both the controller unit A and the controlled device C, so that means for completing one of the functions of the controller unit, as the circuit closing function, is positively actuated, while means for completing another of the functions as the bolting device, is conditionally operated. This is accomplished by placing within the sleeve 52 of the actuator assembly, a compression spring 61, disposed between the eyelet 111 and the sleeve cover 53. Due to this construction, the eyelet 111 and the attached wire 110, are capable of movement within the sleeve 52, but are normally moved with the assembly upon actuation of the sleeve.

When the parts are associated in the unlocked relation, in which the contacts 32 and 41 are engaged, and the bolts 95 and 96 are withdrawn from the rods 91 and 92, the actuator assembly may be operated by the plug 21, irrespective of the condition of alignment of the notches 93 and 94 with the bore 97. In the unlocked relation the parts 95, 96 and 113 will be positioned as shown in the dotted line position of Fig. 1, and indicated at 95a, 96a and 113a respectively.

It is obvious, that should either one of the rods 91 or 92 be shifted to a position in which one of the notches 93 or 94 are out of alignment with the bore 97, that the bolts 95 and 96, and consequently the wire 110 connecting them to the actuator assembly cannot be moved from the dotted line position.

However, due to the resilient connection of the wire and eyelet to the actuator assembly, the assembly may still be actuated to the locked position in which the circuit through the device is opened, by simply pushing the barrel 21 within the case 20. Under these particular conditions, the eyelet and wire assembly with the connected bolts will remain in the dotted line position compressing the spring 61 within the sleeve 52 between the eyelet 111 and the cap 53, as the actuator assembly is moved inwardly. Of course one of the bolts 95 and 96 will be forced against one or the other of the rods 91 and 92, by the spring 61 acting within the sleeve 52. The second function is thus conditionally operated.

Any attempt to move the vehicle would result in a completion in the operation of this second function, for the vehicle cannot be moved or towed away while the gear relation is established, and as soon as the gear shift lever is moved to the neutral position both of the notches 93 and 94 are in alignment with the bore 97, and the bolts are projected to the locking position by the energy stored up within the actuator assembly.

The operation of the device is obvious from the foregoing, and it is apparent that an efficient locking mechanism has been provided which enables the operator to leave his vehicle parked or standing under varied conditions and which insures against accidental or unauthorized removal.

While the form of embodiment of the present invention as herein disclosed, constitutes a preferred form, it is to be understood that other forms might be adopted, all coming within the scope of the claims which follow.

What is claimed is as follows:

1. In a controller unit for controlling a plurality of functions, the combination comprising, circuit function completing means, bolting function completing means, and an actuator assembly for both of the function completing means, including, a sleeve and cap disposed in end engagement with one of the completing means for positive actuation thereof, and disposed about a portion of the other function completing means, and a spring within the sleeve between the cap and said other function completing means for conditional actuation thereof.

2. In a lock controller for controlling a plurality of functions, the combination comprising, circuit function completing means, bolting function completing means, and an actuator assembly for both of the function completing means, a sleeve and cap disposed in end engagement with the circuit function completing means for positive actuation thereof and disposed about a portion of the bolting function completing means, and a spring within the sleeve between the cap and the said bolting function means for conditional actuation thereof.

3. In a lock controller for automotive vehicles, the combination of a case, a key controlled device movable endwise within the case, stationary switch contacts insulatingly supported within the case, a bridging contact moved into and out of engagement with the stationary contacts by the key controlled device, a tubular member attached to the device and movable endwise with the case, a wire for operating a bolting device extending through the case and the tubular member supporting the bridging contact, a non-conducting contact carrier slidably supported by the tube and supporting the bridging contact, a spring in the case and located so as to transmit pressure for yieldingly maintaining the bridging contact in engagement with the other contacts, and a spring yieldingly transmitting motion of the key controlled device to the wire.

4. In a lock controller for automotive vehicles, the combination of a case, a key controlled device movable endwise within the case, stationary switch contacts insulatingly supported within the case, a bridging contact moved into and out of engagement with the stationary contacts by the key controlled device, a wire for operating a bolting device extending through the case, a non-conducting contact carrier slidably supported by the tube and supporting the bridging contact, a spring in the case and located so as to transmit pressure for yieldingly maintaining the bridging contact in engagement with the other contacts, and an actuator assembly positively operating upon the contact carrier, and conditionally operating upon the wire.

5. In a lock controller for automotive vehicles, the combination of a case, a key controlled device movable endwise within the case, stationary switch contacts insulatingly supported within the case, a bridging contact moved into and out of engagement with the stationary contacts by the key controlled device, a wire for operating a bolting device extending through the case, a non-conducting contact carrier slidably supported by the tube and supporting the bridging contact, a spring in the case and located so as to transmit pressure for yieldingly maintaining the bridging contact in engagement with the other contacts, and an actuator assembly operable during the locking cycle to positively actuate the contact carrier and conditionally actuate the wire.

6. In a lock controller for automotive vehicles, the combination of a case, a key controlled device movable endwise within the case, stationary switch contacts insulatingly supported within the case, a bridging contact moved into and out of engagement with the stationary contacts by the key controlled device, a wire for operating a bolting device extending through the case, a non-conducting contact carrier slidably supported by the tube and supporting the bridging contact, a spring in the case and located so as to transmit pressure for yieldingly maintaining the bridging contact in engagement with the other contacts, and an actuator assembly operable during the locking cycle to positively actuate the contact carrier and conditionally actuate the bolting member, and operable during release cycle to positively actuate both the contact carrier and the wire.

7. In a lock controller for automotive vehicles, the combination of a case, a key controlled device movable endwise within the case, stationary switch contacts insulatingly supported within the case, a bridging contact moved into and out of engagement with the stationary contacts by the key controlled device, a wire for operating a bolting device extending through the case, a non-conducting contact carrier slidably supported by the tube and supporting the bridging contact, a spring in the case and located so as to transmit pressure for yieldingly maintaining the bridging contact in engagement with the other contacts and an actuator assembly operable during the locking cycle to positively actuate the contact carrier for opening a circuit, and conditionally actuate the wire.

8. In a lock controller for automotive vehicles, the combination of a case, a key controlled device movable endwise within the case, stationary switch contacts insulatingly supported within the case, a bridging contact moved into and out of engagement with the stationary contacts by the key controlled device, a wire for operating a bolting device extending through the case, a non-conducting carrier slidably supported by the tube and supporting the bridging contact, a spring in the case and located so as to transmit pressure for yieldingly maintaining the bridging contact in engagement with the other contacts, an actuator assembly operable during the locking cycle to positively actuate the contact carrier for opening a circuit, and conditionally actuate the bolting member, and means for urging the actuator assembly to normal position during the release cycle, and thereby positively actuating both the contact carrier and the wire.

9. A controller for automotive vehicles comprising, in combination, a tubular case, a partition dividing the case into compartments, a key controlled device slidable axially of the case and located in one compartment, a switch contact carried slidably axially of the case and located in the other compartment, a bridging contact carried by the carrier, stationary contacts insulatingly supported by the partition and engageable by the bridging contact, a locking bolt actuator, means for transmitting motion from the key controlled device to the contact carrier, and means for transmitting motion yieldingly from the key controlled device to the locking bolt actuator.

10. A controller for automotive vehicles comprising, in combination, a tubular case, a partition dividing the case into compartments, a key controlled device slidable axially of the case and located in one compartment, a switch contact carried slidably axially of the case and located in the other compartment, a bridging contact carried by the carrier, stationary contacts insulatingly supported by the partition and engageable by the bridging contact, a locking bolt actuator, means for transmitting motion from the key controlled device to the contact carrier, and non-yieldingly in one direction to the locking bolt actuator, and means for transmitting motion yieldingly from the key controlled device to the locking bolt actuator in the other direction.

11. A controller for automotive vehicles comprising, in combination, a tubular case, a partition dividing the case into compartments, a key controlled device slidable axially of the case and located in one compartment, a switch contact carried slidably axially of the case and located in the other compartment, a bridging contact carried by the carrier, stationary contacts insulatingly supported by the partition and engageable by the bridging contact, a locking bolt actuator, means for transmitting motion from the key controlled device to the contact carrier, and means including a spring passing through said partition for transmitting motion yieldingly from the key controlled device to the locking bolt actuator.

12. A controller for automotive vehicles comprising, in combination, a tubular case, a partition dividing the case into compartments, a key controlled device slidable axially of the case and located in one compartment, a switch contact carried slidably axially of the case and located in the other compartment, a bridging contact carried by the carrier, stationary contacts insulatingly supported by the partition and engagable by the bridging contact, a locking bolt actuator, means for transmitting motion from the key controlled device to the contact carrier, and non-yieldingly in one direction to the locking bolt actuator, and means including a spring passing through said partition for transmitting motion yieldingly from the key controlled device to the locking bolt actuator in the other direction.

13. A controller for automotive vehicles comprising, in combination, a tubular case, a partition dividing the case into compartments, a key controlled device slidable axially of the case and located in one compartment, a switch contact carried slidably axially of the case and located in the other compartment, a bridging contact carried by the carrier, stationary contacts insulatingly supported by the partition and engageable by the bridging contact, a locking bolt actuator, a tube passing through the partition for transmitting motion from the key controlled device to the contact carrier, and means for transmitting motion yieldingly from the key controlled device to the locking bolt actuator.

14. A controller for automotive vehicles comprising, in combination, a tubular case, a partition dividing the case into compartments, a key controlled device slidable axially of the case and located in one compartment, a switch contact carried slidably axially of the case and located in the other compartment, a bridging contact carried by the carrier, stationary contacts insulatingly supported by the partition and engageable by the bridging contact, a locking bolt actuator, a tube passing through the partition for transmitting motion from the key controlled device to the contact carrier, and means including a spring located in said tube for transmitting motion yieldingly from the key controlled device to the locking bolt actuator.

15. A controller for automotive vehicles comprising, in combination, a tubular case, a partition dividing the case into compartments, a key controlled device slidable axially of the case and located in one compartment, a switch contact carried slidably axially of the case and located in the other compartment, a bridging contact carried by the carrier, stationary contacts insulatingly supported by the partition and engageable by the bridging contact, a locking bolt actuator, a tube passing through the partition for transmitting motion from the key controlled device to the contact carrier and non-yieldingly in one direction to the locking bolt-actuator, and means for transmitting motion yieldingly from the key controlled device to the locking bolt actuator in the other direction.

16. A controller for automotive vehicles comprising in combination, a tubular case, a partition dividing the case into compartments, a key controlled device slidable axially of the case and located in one compartment, a switch contact carried slidably axially of the case and located in the other compartment, a bridging contact carried by the carrier, stationary contacts insulatingly supported by the partition and engageable by the bridging contact, a locking bolt actuator, a tube passing through the partition for transmitting motion from the key controlled device to the contact carrier, and non-yieldingly in one direction to the locking bolt actuator, and means including a spring located in said tube for transmitting motion yieldingly from the key controlled device to the locking bolt actuator in the other direction.

17. A controller for automotive vehicles comprising, in combination, a tubular case, a partition dividing the case into compartments, a key controlled device slidable axially of the case and located in one compartment, a switch contact carried slidably axially of the case and located in the other compartment, a bridging contact carried by the carrier, stationary contacts insulatingly supported by the partition and engageable by the bridging contact, a locking bolt actuator, a tube passing through the partition for transmitting motion from the key controlled device to the contact carrier, means for transmitting motion yieldingly from the key controlled device to the locking bolt actuator, and a spring bearing against the partition and urging the tube against the inner end of the key controlled device.

18. A controller for automotive vehicles, comprising in combination, a tubular case, a partition dividing the case into compartments, a key controlled device slidable axially of the case and located in one compartment, a switch contact carried slidably axially of the case and located in the other compartment, a bridging contact carried by the carrier, stationary contacts insulatingly supported by the partition and engageable by the bridging contact, a locking bolt actuator, a tube passing through the partition for transmitting motion from the key controlled device to the contact carrier, said actuator including a wire extending through the contact carrier and into the tube and having a bent over portion slidable relative to the tube, means for transmiting motion from the tube to the bent portion of the wire nonyieldingly in one direction, a spring within the tube for transmitting motion from the key controlled device to the bent portion of the wire yieldingly in the opposite direction, and a spring located between said partition and a flange provided by said tube for urging the tube against the key controlled device.

In testimony whereof I hereto affix my signature.

HARRY E. NORVIEL.